US00RE34593E

United States Patent [19]

Moncrieff Baldwin et al.

[11] E Patent Number: Re. 34,593

[45] Reissued Date of Patent: Apr. 26, 1994

[54] LOOSE-LEAF NOTEBOOK CONSTRUCTION

[75] Inventors: Judith A. Moncrieff Baldwin, New York; Steven Selwyn, Brooklyn, both of N.Y.

[73] Assignee: Strategic Financial Communications Corp., New York, N.Y.

[21] Appl. No.: 874,681

[22] Filed: Apr. 27, 1992

Related U.S. Patent Documents

Reissue of:

[64] Patent No.: 4,930,925
Issued: Jun. 5, 1990
Appl. No.: 329,655
Filed: Mar. 28, 1989

[51] Int. Cl.[5] ..... B42F 13/22

[52] U.S. Cl. ..... 402/30; 402/80 R; 402/40

[58] Field of Search ..... 402/29, 30, 31, 42, 402/43, 44, 45, 46, 47, 48, 49, 50, 54, 55, 56, 80 R

[56] References Cited

U.S. PATENT DOCUMENTS

| | | | |
|---|---|---|---|
| 743,114 | 11/1903 | Trussell | 402/42 |
| 804,599 | 11/1905 | Harn | 402/42 |
| 2,715,906 | 8/1955 | Lucchesi | 402/42 X |
| 2,856,660 | 10/1958 | Twohig | 402/44 |
| 3,280,821 | 10/1966 | Dougherty | 402/42 |

FOREIGN PATENT DOCUMENTS

| | | | |
|---|---|---|---|
| 973113 | 2/1951 | France | 402/42 |
| 63048 | 7/1955 | France | 402/42 |
| 148278 | 1/1921 | United Kingdom | 402/42 |

*Primary Examiner*—Paul A. Bell
*Attorney, Agent, or Firm*—Schweitzer Cornman & Gross

[57] ABSTRACT

The invention is a notebook having a cover and a selectively openable and closable binder mechanism which can support a plurality of pre-punched, loose-leaf sheets. The binder mechanism includes the following: (a) an elongated rigid plate; (b) a hollow tubular support channel including upper and lower portions fixed to the plate and in coaxial relation with one another; (c) an opposed pair of pivotable clam-shell sheet retainers which are cooperatively associated so as to define a closed, generally elongated cylindrical, sheet holder in a first radial position and an open split cylinder in a second radial position; (d) the clam-shell sheet retainers include a rod-like pivot which pivot is slidably mounted in the support channel for a limited axial movement between a first normally restrained position and a second normally unrestrained position; (e) a first spring which biases the pivot towards its first normally restrained position; (f) a second spring which radially biases the clam-shell sheet retainers apart towards their open position; and (g) a cam associated with the support channel and operative to force the clam-shall sheet retainers into their closed position.

10 Claims, 2 Drawing Sheets

LOOSE-LEAF NOTEBOOK CONSTRUCTION

Matter enclosed in heavy brackets [ ] appears in the original patent but forms no part of this reissue specification; matter printed in italics indicates the additions made by reissue.

BACKGROUND OF THE INVENTION

Looseleaf notebooks having two, three or even more rings which may be selectively opened or closed to accent pages having punched holes therein are well known to the art. The present invention is directed to an improvement in binders for looseleaf notebooks in which the binding mechanism is not a ring but a split cylinder having "clam-shell" type of construction. The loose-leaf pages of the new notebook will not have circular holes for mounting on rings, rather they will have one or more elongated slots for being removably mounted on the elongated cylindrical clam-shell hold ers. Significantly, small notebooks need have only one cylindrical leaf holder in the center of the spine for the new notebook to mount the pages thereof. This presents an extraordinarily attractive and simple construction.

SUMMARY OF THE PRESENT INVENTION

A notebook comprising a binder and a single clam-shall leaf holder which is selectively openable and closable to accept a plurality of loose-leaf pages having elongated slots formed therein, adjacent top the edges of the pages represents the fundamental concept of the present invention. Specifically, the clam-shell cylindrical holder is spring loaded so as to tend to open when not restrained by another spring mechanism and a camming mechanism in a closed position.

The cylindrical clam-shell elements forming the cylindrical binder are supported on slidable rods which are mounted in tubular channels for displacement "axially" along a spine. The clam-shell members are cammed from the opened position into a closed position by engagement with a camming surface formed in one of the tubular support channels.

For a better appreciation of the notebook of the present invention and its attendant advantages, reference should be made to the following drawings taken in conjunction with the following detailed description of the invention.

DETAILED DESCRIPTION OF THE INVENTION

Figure 1:
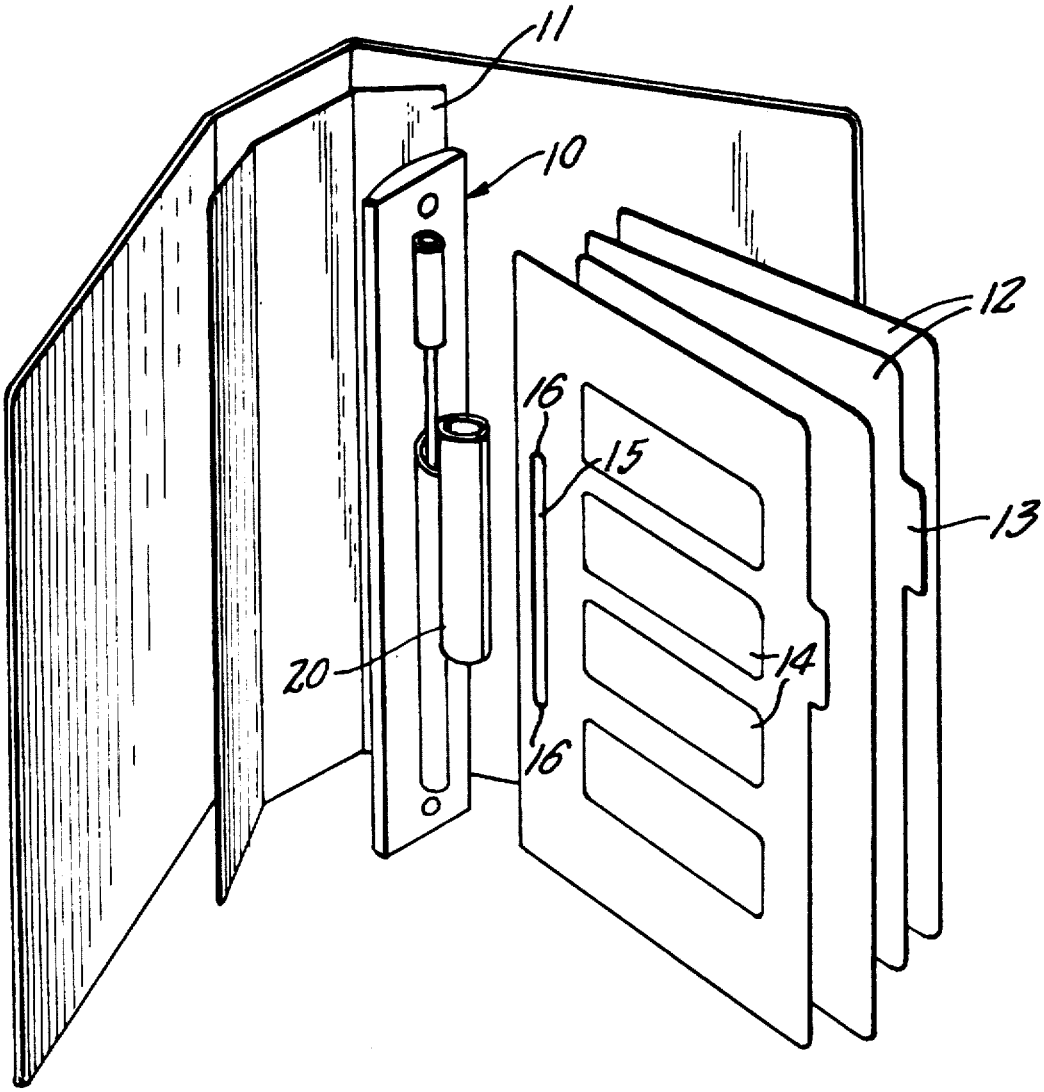
FIG. 1 is an exploded perspective view of the new binder construction of the present invention.
Figure 2:
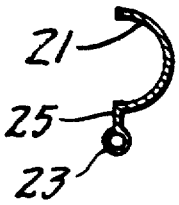
FIG. 2 is a cross-sectional view of a new clam-shell member embodying the principles of the invention.
Figure 3:
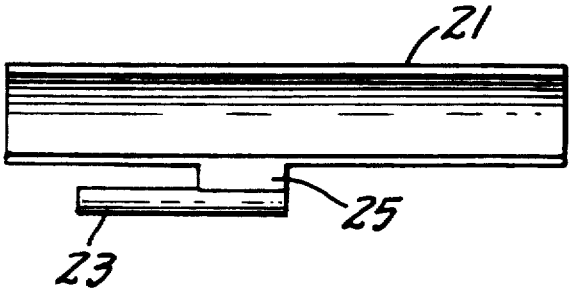
FIG. 3 is a side elevational view of the clam-shell member of FIG. 2.

Referring now to FIG. 1, the notebook of the present invention includes generally, a binder mechanism 10 which is mounted to a notebook cover spine 11, and a plurality of loose-leaf pages 12 which are supported in the binder mechanism 10. The individual pages 12 may include tabs 13, and/or pressure sensitive adhesive-coated labels bearing preprinted information or space for the inclusion by hand of certain information in accordance with the principles set forth in co-pending application Ser. No. 206,428 filed June 14, 1988 which is incorporated by reference herein. In addition, at the inner edges of each of the pages 12, is an elongated slot 15, having rounded upper and lower edges 16.

Figure 4:
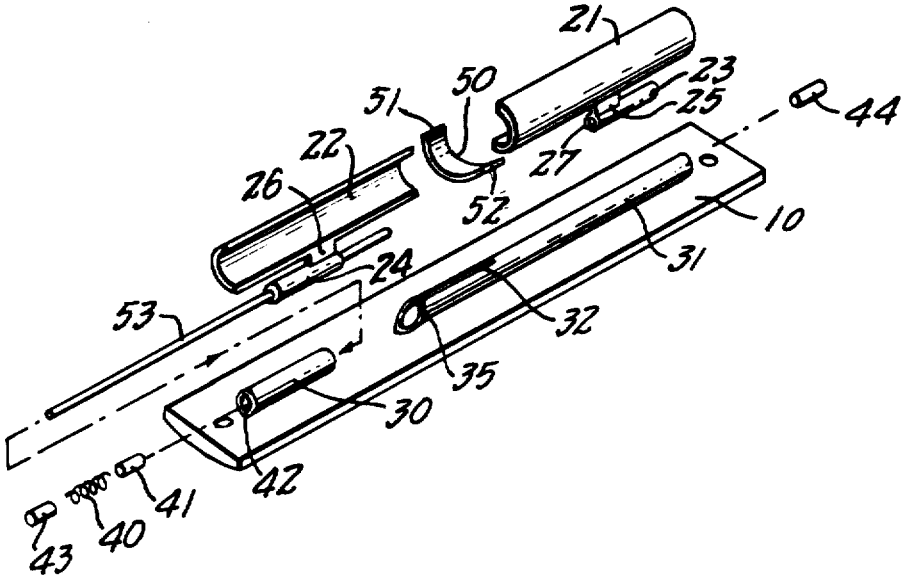
FIG. 4 is an exploded perspective view showing the elements of the binder mechanism of the new invention.
Figure 5:
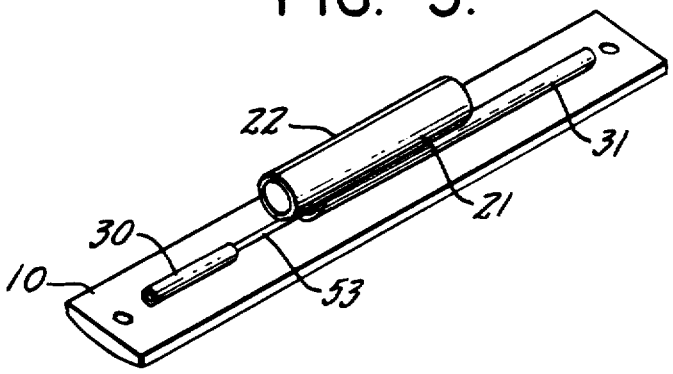
FIG. 5 is a perspective view of the binder mechanism of the invention.

The pages 12 are mounted through the slot 15 on a new and improved split cylindrical leaf holder 20 which forms a major element of the binder mechanism 10. Specifically, the cylindrical binder 20 is comprised of half cylinders 21 and 22 (FIG. 4), each of which is mounted on an elongated rod 23, 24 through an intermediate web 25, 26 as shown in FIG. 4. These clam-shell elements 21, 22 are mirror images of one another as will be appreciated. More specifically, the clam-shell 21 projects forwardly beyond the end of supporting rod 23, while the edge of mating clam-shell 22 projects forwardly from its supporting rod 24. Thus, in accordance with the present invention, when the edge 27 of the rod 23 abuts the edge 28 of the rod 24 the clam-shells 21 and 22 will be in juxtaposition with one another as shown in FIG. 5 and adapted to cooperate to form a complete cylinder. As shown in FIG. 5 with the rods 23 and 24 butting and disposed in an uppermost position in support channels 30 and 31 the clam-shell elements 21 and 22 are held together in closed cylindrical form by virtue of the webs 25, 26 being held in alignment in the elongated slot 32 found in the tubular support 31.

The clam-shell elements 21, 22 are urged into the normally closed cylindrical position (with webs 25, 26 in slot 32 ) by a spring 40, an intermediate spacer 41 inserted in opening 42 formed in the tubular support member 30, and cylindrical end cap 43 which completes the assembly of the clam-shell elements 22 into the tubular member 30 at the left-hand end thereof, while an end cap 44 closes off the tubular support member 31 at the right-hand end thereof as shown in FIG. 4.

It will be understood that the rods 23, 24 are axially displacable in the tubular support members 30, 31 from a position in which the cylindrical members are closed, i.e., webs 25, 26 are aligned and restrained in the slot 32 to a position in which the clam-shell elements are opened when the rods 23, 24 are displaced to the left of FIG. 4 to permit the web members 25, 26 to be displaced radially outwardly from one another by virtue of an interposed leaf spring 50 having ends 51, 52 bearing against the webs 25, 26 respectively to urge them apart.

Figure 6:
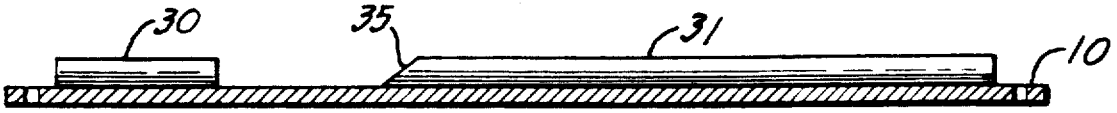
FIG. 6 is a cross-sectional view of the support for the binder of the invention.

Thus, when the clam-shell 20 is displaced by sliding to the left (FIG. 5) the spring member 50 urges the clam-shell 21, 22 apart to open the same to receive the slotted pages 12. Thus, when the rods 23, 24 are displaced by sliding to the right (FIG. 5) the webs 25, 26 are cammed by the tear-shaped camming opening 35 which leads into the narrow slot 32 as shown in FIGS. 4,5 and FIG. 6.

The present new and improved notebook construction lends itself to simple and efficient manufacturing and assembly techniques which result in a new and unique binder construction for loose leaf type notebooks. The tubular members 30, 31 may be formed integrally with spine member 60 or may be fabricated separately as found necessary or desirable. Similarly, each of the clam-shell members 21, 22 may be made from a common extrusion which may thereafter by machined to the final mirror image construction shown in FIG. 4.

While, the present notebook construction has been illustrated in the form of a single cylindrical clam-shell holder 20 to mount loose-leaf pages having a single elongated slot therein, it will be appreciated that with extra large pages it may be necessary or desirable to use two, three or even four cylinders. It should be understood of course, that the specific embodiment herein illustrated and described is intended to be for the purposes of example and representative only, as certain changes may be made therein without departing from the clear teachings of the disclosure. Accordingly, reference should be made to following appended claims in determining the full scope of the invention.

We claim:

1. In a notebook construction having cover and a selectively openable and closeable binder mechanism for supporting a plurality of pre-punched loose-leaf pages, the improvement in which said binder mechanism includes:

(a) an elongated rigid plate means;

(b) a hollow tubular support channel means including upper and lower portions fixed to said plate means in coaxial relation with one another;

(c) an opposed pair of pivotable clam shell means cooperatively associated to define a closed, generally elongated cylindrical, leaf holder in a first radial position and an open split cylinder in a second radial position;

(d) said clam shell means including a rod-like pivot means slidably mounted in said support channel for limited axial displacement between a first normally restrained position and a second normally unrestrained position;

(e) first spring means axially biasing said pivot means toward said first normally restrained position;

(f) second spring means radially biasing said clam-shell means apart toward said open position; and (g) camming means associated with said support channel means and operative to cam said clam shell means into said closed position.

2. The binder mechanism of claim 1 in which (a) each of said pair of clam shell means is supported in fixed, spaced relation with said pivot means by a vertical web extending for approximately half the length of said split cylinder leaf holder;

(b) each of said split cylinders projecting beyond the ends of the pivot means for a distance equal to approximately half the length of said split cylinders;

(c) the ends of the pivot means of each of said clam shell means being butted.

3. The binder mechanism of claim 1 further including (a) a plurality of loose-leaf pages each of which defines an elongated slot adjacent the inner edges thereof;

(b) said slots being of a length slightly greater than the length of said split cylinder leaf holder.

4. The binder mechanism of claim 3 in which (a) said slot is disposed medially of the inner edge and extends for approximately one third of the length of said edge.

5. The binder mechanism of claim 1, in which (a) said camming means comprises an elongated tear-shaped groove defined centrally of said support channel;

(b) said groove merging with an elongated slot having a width slightly greater than the width of said web means;

(c) whereby said clam shell means may be allowed to assume a split cylindrical position when the web means said clam shell means is beyond said elongated slot and said clam shell means is cammed into a closed position when the web means of both of said clam shell means are disposed within said slot.

*6. In a notebook construction having cover and a selectively openable and closeable binder mechanism for supporting a plurality of pre-punched loose-leaf pages, the improvement in which said binder mechanism includes:*

*(a) an elongated rigid plate means;*

*(b) a hollow tubular support channel means including upper and lower portions fixed to said plate means in coaxial relation with one another;*

*(c) an opposed pair of pivotable clam shell means cooperatively associated to define a closed, generally elongated cylindrical, leaf holder in a first radial position and an open split cylinder in a second radial position;*

*(d) said clam shell means including a rod-like pivot means slidably mounted in said support channel for limited axial displacement between a first normally restrained position and a second normally unrestrained position;*

*(e) first spring means axially biasing said pivot means toward said first normally restrained position; and*

*(f) camming means associated with said support channel means and operative to cam said clam shell means into said closed position.*

*7. The binder mechanism of claim 6 in which*

*(a) each of said pair of clam shell means is supported in fixed, spaced relation with said pivot means by a vertical web extending for approximately half the length of said split cylinder leaf holder;*

*(b) each of said split cylinders projecting beyond the ends of the pivot means for a distance equal to approximately half the length of said split cylinders;*

*(c) the ends of the pivot means of each of said clam shell means being butted.*

*8. The binder mechanism of claim 6 further including*

*(a) a plurality of loose-leaf pages each of which defines an elongated slot adjacent the inner edges thereof;*

*(b) said slots being of a length slightly greater than the length of said split cylinder leaf holder.*

*9. The binder mechanism of claim 8 in which*

*(a) said slot is disposed medially of the inner edge and extends for approximately one third of the length of said edge.*

*10. The binder mechanism of claim 6, in which*

*(a) said camming means comprises an elongated tear-shaped groove defined centrally of said support channel;*

*(b) said groove merging with an elongated slot having a width slightly greater than the width of said web means;*

*(c) whereby said clam shell means may be allowed to assume a split cylindrical position when the web means and said clam shell means is beyond said elongated slot and said clam shell means is cammed into a closed position when the web means of both of said clam shell means are disposed within said slot.*

* * * * *